US008650797B2

(12) United States Patent
Sugita et al.

(10) Patent No.: US 8,650,797 B2
(45) Date of Patent: Feb. 18, 2014

(54) DLC-COATED FISHING LURE

(75) Inventors: Hiroaki Sugita, Toyokawa (JP); Mitsuyoshi Hikosaka, Shinshiro (JP); Toshihiro Itoh, Shinshiro (JP)

(73) Assignees: OSG Corporation, Toyokawa-Shi (JP); OSG Coating Service Co., Ltd., Shinshiro-Shi (JP)

( * ) Notice: Subject to any disclaimer, the term of this patent is extended or adjusted under 35 U.S.C. 154(b) by 548 days.

(21) Appl. No.: 12/690,527

(22) Filed: Jan. 20, 2010

(65) Prior Publication Data

US 2010/0212210 A1 Aug. 26, 2010

(30) Foreign Application Priority Data

Feb. 26, 2009 (JP) ................... 2009-044740

(51) Int. Cl.
- *A01K 85/01* (2006.01)
- *A01K 85/14* (2006.01)
- *A01K 85/00* (2006.01)

(52) U.S. Cl.
USPC ............................ 43/42.32; 43/42.33; 43/42.5

(58) Field of Classification Search
USPC ............................ 43/42.32, 42.33, 42.34, 42.5
See application file for complete search history.

(56) References Cited

U.S. PATENT DOCUMENTS

| | | | | |
|---|---|---|---|---|
| 916,691 | A | * | 3/1909 | Fey ................................. 43/42.5 |
| 1,862,917 | A | * | 6/1932 | Anderson ....................... 43/42.5 |
| 2,124,152 | A | * | 7/1938 | Salm ............................. 43/42.32 |
| 2,188,753 | A | * | 1/1940 | Jennings ...................... 43/42.32 |
| 2,192,563 | A | * | 3/1940 | Starkey ......................... 43/42.34 |
| 2,547,240 | A | * | 4/1951 | Young et al. ................. 43/42.34 |
| 2,657,495 | A | * | 11/1953 | Eppinger ..................... 43/42.33 |
| 2,708,806 | A | * | 5/1955 | Siebert ......................... 43/42.33 |
| 2,796,693 | A | * | 6/1957 | Gunterman .................. 43/42.32 |
| 2,933,847 | A | * | 4/1960 | Frasure ........................ 43/42.33 |
| 2,951,308 | A | * | 9/1960 | Kent ............................. 43/42.33 |
| 3,122,853 | A | * | 3/1964 | Koonz et al. ................. 43/42.33 |
| 3,289,345 | A | * | 12/1966 | Reininger et al. ........... 43/42.32 |
| 3,413,750 | A | * | 12/1968 | Henry .......................... 43/42.33 |
| 3,528,189 | A | * | 9/1970 | Lilley, Jr. ..................... 43/42.33 |
| 3,631,625 | A | * | 1/1972 | Castner ........................ 43/42.33 |
| 3,855,721 | A | * | 12/1974 | Strader ........................ 43/42.32 |

(Continued)

FOREIGN PATENT DOCUMENTS

| | | | | |
|---|---|---|---|---|
| CH | 679102 A5 | * | 12/1991 | ............. A01K 85/14 |
| JP | 03122280 A | * | 5/1991 | ............. C23C 16/30 |

(Continued)

*Primary Examiner* — Darren W Ark
(74) *Attorney, Agent, or Firm* — Oliff PLC

(57) ABSTRACT

A DLC-coated fishing lure includes a fishing lure base material made of metal and having a predetermined shape; an intermediate layer made of one selected from a first group, a second group and a third group, the first group consisting of at least one kind of metal selected from the IIIb group, the IVa group, the Va group and the VIa group in the periodic table of elements, the second group consisting of at least one of a carbide, a nitride and a carbonitride of the at least one kind of metal, and the third group consisting of a mutual solid solution made of at least one selected from the first group and the second group, the intermediate layer being formed on a surface of the fishing lure base material; and a DLC layer having a thickness ranging from about 0.05 μm to about 0.55 μm and formed on the intermediate layer, the DLC layer presenting an appearance of a interference color.

5 Claims, 3 Drawing Sheets

(56) References Cited

U.S. PATENT DOCUMENTS

| | | | |
|---|---|---|---|
| 4,199,888 A * | 4/1980 | Barnes | 43/42.33 |
| 4,479,323 A * | 10/1984 | Burr | 43/42.5 |
| 4,713,906 A * | 12/1987 | Distaffen | 43/42.5 |
| 4,803,793 A * | 2/1989 | Schellenberg, III | 43/42.33 |
| 4,828,728 A * | 5/1989 | Dimigen et al. | 508/107 |
| 4,831,765 A * | 5/1989 | Bradshaw | 43/42.32 |
| 4,835,899 A * | 6/1989 | Helton | 43/42.33 |
| 4,862,631 A * | 9/1989 | Wilson et al. | 43/42.33 |
| 5,009,023 A * | 4/1991 | Hoyt | 43/42.5 |
| 5,062,236 A * | 11/1991 | Fish | 43/42.5 |
| 5,190,807 A * | 3/1993 | Kimock et al. | 428/216 |
| 5,276,537 A * | 1/1994 | Savant et al. | 359/3 |
| 5,388,366 A * | 2/1995 | Kretschmer | 43/42.32 |
| 5,405,373 A * | 4/1995 | Petersson et al. | 607/121 |
| 5,653,812 A * | 8/1997 | Petrmichl et al. | 118/723 E |
| 5,731,045 A * | 3/1998 | Dearnaley et al. | 427/527 |
| 5,737,867 A * | 4/1998 | Tsutsumi et al. | 43/42.33 |
| 6,018,902 A * | 2/2000 | Gudermuth et al. | 43/42.33 |
| 6,029,390 A * | 2/2000 | Kaminsky | 43/42.32 |
| 6,033,533 A * | 3/2000 | Sugiyama et al. | 204/192.12 |
| 6,088,947 A * | 7/2000 | Suzue et al. | 43/18.1 R |
| 6,126,793 A * | 10/2000 | Sugiyama et al. | 204/192.23 |
| 6,200,675 B1 * | 3/2001 | Neerinck et al. | 428/336 |
| 6,228,471 B1 * | 5/2001 | Neerinck et al. | 428/216 |
| 6,318,020 B1 * | 11/2001 | Mefferd | 43/42.32 |
| 6,467,591 B2 * | 10/2002 | Ohara | 188/251 A |
| 6,790,535 B2 * | 9/2004 | Nishimura et al. | 428/457 |
| 8,021,732 B2 * | 9/2011 | Hegemier et al. | 428/40.1 |
| 2002/0056222 A1* | 5/2002 | Andersen | 43/42.5 |
| 2007/0104953 A1* | 5/2007 | Sugita | 428/408 |
| 2011/0104404 A1* | 5/2011 | Hamamura | 428/31 |

FOREIGN PATENT DOCUMENTS

| | | | | |
|---|---|---|---|---|
| JP | 08073289 A * | 3/1996 | | C04B 41/89 |
| JP | 2000217467 A * | 8/2000 | | A01K 85/00 |
| JP | 2006141285 A * | 6/2006 | | A01K 85/00 |
| JP | A-2006-141285 | 6/2006 | | |

* cited by examiner

THICKNESS OF DLC LAYER (μm)

SHAPE OF TEST PIN: 6 mm IN DIAMETER, 25 mm IN LENGTH AND 5R

PRESENT INVENTION HAVING TiN INTERMEDIATE LAYER

COMPARATIVE HAVING NO INTERMEDIATE LAYER

DLC-COATED FISHING LURE

This application is based on Japanese Patent Application No. 2009-044740 filed on Feb. 26, 2009, the contents of which are incorporated hereinto by reference.

BACKGROUND OF THE INVENTION

1. Field of the Invention

The present invention relates to a fishing lure, particularly, to a DLC-coated fishing lure presenting an appearance of the interference color such as a rainbow color or iridescence, and superior in durability.

2. Description of Related Art

The fishing lure used for lure fishing is made to have fish catch the fishing lure in mistaking it for small fish or an insect under water, and there are known various fishing lures having different shapes, quality of material or appearances in order that the object fish may be interested in. For instance, JP 2006-141285 discloses a fishing lure presenting an appearance of the interference color such as a rainbow color by forming a transparent organic compound layer in the vapor deposition polymerization process or a transparent metal oxide layer in the physical vapor deposition (PVD) process, on the surface of the base material of the fishing lure made of such as stainless steel or plastics, and a desired catch of fish is expected by reproduction of similar color to natural creatures such as fish and insects. JP 2006-141285 also discloses techniques to print a coating compound reflecting a light to emit a rainbow-color light on the surface of the fishing lure base material, and to stick a seal or a hologram sheet on the surface.

However, these conventional techniques have disadvantages that they are not necessarily sufficient in durability because the layer coated was early worn, broken or flaked due to its fragility by, for instance, hitting on such as a stone under water in use. Upon applying the coating compound or sticking the seal, sufficient durability may not be achieved because the coating compound may be removed or the seal may be broken.

It is therefore an object of the present invention to provide a fishing lure presenting an appearance of the interference color such as a rainbow color or iridescence, and superior in durability.

SUMMARY OF THE INVENTION

The object indicated above may be achieved according to a first mode of the invention, which provides a DLC-coated fishing lure including: (a) a fishing lure base material made of metal and having a predetermined shape; (b) an intermediate layer made of one selected from a first group, a second group and a third group, the first group consisting of at least one kind of metal selected from the IIIb group, the IVa group, the Va group and the VIa group in the periodic table of elements, the second group consisting of at least one of a carbide, a nitride and a carbonitride of the at least one kind of metal, and the third group consisting of a mutual solid solution made of at least one selected from the first group and the second group, the intermediate layer being formed on a surface of the fishing lure base material; and (c) a DLC layer having a thickness ranging from about 0.05 μm to about 0.55 μm and formed on the intermediate layer, the DLC layer presenting an appearance of a interference color.

The DLC layer is a thin layer made of Diamond Like Carbon (DLC). The DLC has a minute amorphous structure, and is superior in hardness and abrasion resistance although it is crystallographically different from diamond.

The object indicated above may be achieved according to a second mode of the invention, which provides the fishing lure of the first mode, wherein the thickness of the DLC layer smoothly varies within a width of about 0.05 μm or over.

The object indicated above may be achieved according to a third mode of the invention, which provides the fishing lure of the first or second mode, wherein a surface of the fishing lure base material has a smoothly bowed shape.

The object indicated above may be achieved according to a fourth mode of the invention, which provides the fishing lure of any one of the first to third modes, wherein a thickness of the intermediate layer ranges from about 0.5 μm to about 3 μm.

According to the first mode of the invention, the DLC-coated fishing lure is preferably used because it presents an appearance of the interference color such as a rainbow color or iridescence due to the DLC layer having the thickness ranging from about 0.05 μm to about 0.55 μm. Such a DLC layer can provide a successive variation in color tone (frequency) with variation of an incident angle of light or a thickness of the layer, and present the nearly natural interference color such as a rainbow color or iridescence by, for instance, the smoothly bowed surface of the fishing lure base material or smooth variation of the layer thickness. The thickness of the DLC layer preferably ranges from about 0.05 μm to about 0.55 μm because the thickness below 0.05 μm presents slight variations in the color tone and the thickness over 0.55 μm presents a muddy and blackish color.

Since the DLC layer is superior in hardness and abrasion resistance, and formed on the fishing lure base material through the intermediate layer made of one selected from a first group, a second group and a third group, the first group consisting of at least one kind of metal selected from the IIIb group, the IVa group, the Va group and the VIa group in the periodic table of elements, the second group consisting of at least one of a carbide, a nitride and a carbonitride of the at least one kind of metal, and the third group consisting of a mutual solid solution made of at least one selected from the first group and the second group, the DLC layer is superior in adhesion and in durability due to its resistance to flaking and wearing.

According to the second mode of the invention, the thickness of the DLC layer smoothly varies within a width of about 0.05 μm or over. Consequently, the variation in its thickness provides the interference color successively varying in the color tone.

According to the third mode of the invention, the surface of the fishing lure base material has a smoothly bowed shape. Consequently, the DLC layer presents the interference color successively varying in the color tone with the variation of the incident angle of light, that is, the viewing angle. And, since the thickness of the DLC layer can smoothly vary by variation of the condition to form each portion of the layer due to the bowed shape of the fishing lure base material in the layer forming technique such as the arc ion plating process even if the DLC layer is formed without an intentional control for the thickness of the layer, it presents the interference color successively varying in the color tone.

According to the fourth mode of the mode of the invention, the thickness of the intermediate layer ranges from about 0.5 μm to about 3 μm. Consequently, the DLC layer is properly superior in adhesion and, accordingly, superior in durability. The thickness below 0.5 μm of the intermediate layer provides inferiority in adhesion, however, the thickness over 3 μm of the intermediate layer hardly provides a difference in adhesion. Accordingly, the thickness of the intermediate layer preferably ranges from about 0.5 µm to about 3 µm in consideration of a cost for manufacturing.

The fishing lure base material according to the present invention may be made of various kinds of metal such as cupper, cupper alloy or stainless steel, and may have various kinds of shapes such as a smoothly-bowed and platelike spoon one and a fish-like plug one.

Preferably, the thickness of the DLC layer may range from about 0.05 µm to about 0.55 µm, and, more preferably, from about 0.1 µm to about 0.5 µm. It may be properly determined in consideration of the shape of the fishing lure such that at least a part of the surface of the base material may be satisfy the aforementioned values to present the interference color, and the whole surface of the base material does not necessarily satisfy the aforementioned values. For instance, 80% or larger of the bowed surface constituting the essentials of a platelike spoon shape may be preferably determined to satisfy the aforementioned values. The thickness of the DLC layer can be measured by, for instance, the electron microscope to view the section of the layer.

The physical vapor deposition (PVD) process such as the arc ion plating process to form layers using graphite as a target or the spattering process is preferably used for forming the DLC layer. This process in a hydrogen atmosphere including hydrogen by introducing such as hydrocarbon gas or hydrogen gas, may cause to form a layer including a predetermined amount (for instance, ranging from 2 atom % to 20 atom %) of hydrogen. Including hydrogen permits to reduce the coefficient of friction and to maintain the luster of the surface. Only on a part of the face side may be formed the layer including hydrogen. Clear coating, for instance, may be applied onto the surface of the DLC layer to emphasize the luster.

The content of hydrogen can be measured by, for instance, the Elastic Recoil Detection Analysis (ERDA) process, however, since a remarkably high value may be obtained around the surface due to an adhered material such as hydrocarbon or water. In such a case, the average of the hydrogen content of the inside of the layer including hydrogen except the surface portion may be preferably determined to range, for instance, from 2 atom % to 20 atom % of hydrogen.

When the surface of the fishing lure base material has a smoothly bowed shape, the thickness of the DLC layer can smoothly vary by variation of the condition to form each portion of the layer due to the bowed shape even if the DLC layer is formed without an intentional control for the thickness of the layer, and it provides the interference color successively varying in color tone. And it is possible to intentionally form a layer with variety in thickness as shown in the aforementioned JP 2006-141285, by such as regulating a positioning angle of the fishing lure base material with regard to the evaporation source (target).

Preferably, the thickness of the DLC layer smoothly varies within a width of about 0.05 µm or over according to the second mode of the invention. However, for instance, when the surface has a smoothly bowed shape, even if the variation in thickness is within a width below 0.05 µm, the interference color is presented by alteration in color tone due to variation of the incident angle of light. Consequently, the variation in thickness within a width below 0.05 µm may be preferable in the first mode of the present invention.

The intermediate layer is, for instance, preferably made of such as TiN, TiCN, TiAlN, TiCrN, CrN or AlCrN and formed in the PVD process such as the arc ion plating process or the spattering process, or may be formed in another process such as the plasma CVD process. The DLC layer formed on the intermediate layer of TiN presents an appearance of the yellowish interference color due to gold color of TiN. The DLC layer formed on the intermediate layer of TiAlN or TiCN presents an appearance of the bluish interference color due to black color of TiAlN and TiCN. Not only the thickness of the DLC layer but the kind of the intermediate layer permit the color tone of the interference color to control.

DETAILED DESCRIPTION OF EXEMPLARY EMBODIMENTS

Hereinafter, there will be described the present invention by reference to the drawings.

Figure 1A:
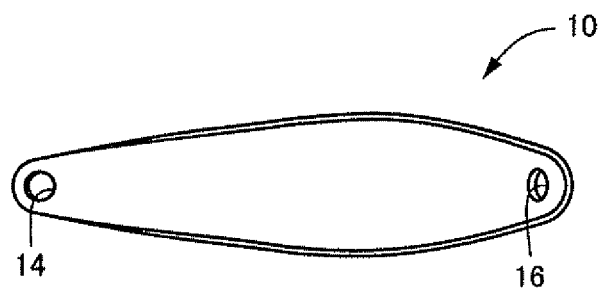
FIGS. 1A to 1D illustrate a DLC-coated fishing lure 10 of an embodiment according to the present invention, in a plan view (FIG. 1A), in a side view (FIG. 1B) from the bottom of FIG. 1A, in a side view (FIG. 1C) from the right of FIG. 1A, and in a sectional view (FIG. 1D) around the surface of the fishing lure.
Figure 1B:
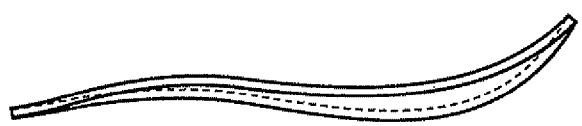
Figure 1C:
Figure 1D:
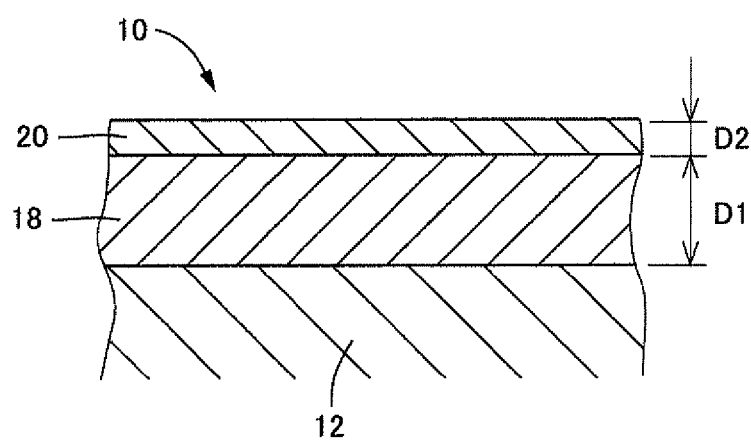

FIGS. 1A to 1D illustrate a DLC-coated fishing lure 10 of an embodiment according to the present invention, in a plan view (FIG. 1A), in a side view (FIG. 1B) from the bottom of FIG. 1A, in a side view (FIG. 1C) from the right of FIG. 1A, and in a sectional view (FIG. 1D) around the surface of the fishing lure 10. A base of the DLC-coated fishing lure 10 is made of a fishing lure base material 12 having a spoon-like shape that is manufactured by stamping out a substantially circular or streamline cupper plate by a pressing machine and by bending it to have a smoothly- and concavely-bowed shape. In both end portions of the fishing lure base material 12 in the longitudinal direction, through-holes 14, 16 to which a fishhook or a fishing line is tied are provided. On the whole surface of the fishing lure base material 12 an intermediate layer 18 is formed and on the intermediate layer 18 a DLC layer 20 is formed. That is, the whole surface of the fishing lure base material 12 is covered with the intermediate layer 18 and the intermediate layer 18 is covered with the DLC layer 20, that is, is coated with DLC.

The intermediate layer 18 is made of one selected from a first group, a second group and a third group, the first group consisting of at least one kind of metal selected from the IIIb group, the IVa group, the Va group and the VIa group in the periodic table of elements, the second group consisting of at least one of a carbide, a nitride and a carbonitride of the at least one kind of metal, and the third group consisting of a mutual solid solution made of at least one selected from the first group and the second group. In this embodiment, the intermediate layer 18 of TiN of gold color is formed in the arc ion plating process. The thickness D1 of the intermediate layer 18 ranges from about 0.5 µm to about 3 µm and is about 1.0 µm in this embodiment, the intermediate layer 18 being formed at a temperature ranging from about 300° C. to about 500° C.

The DLC layer 20 is formed at a temperature ranging from about 80° C. to about 200° C. in the arc ion plating process using graphite as a target in this embodiment. About 10 atom % hydrogen is included in the DLC layer 20 by forming in an atmosphere including hydrogen by introducing a predetermined amount of such as hydrocarbon gas or hydrogen gas then. The content of hydrogen can be measured by, for instance, the ERDA process, however, since a remarkably high value may be obtained around the surface due to an adhered material such as hydrocarbon or water, and an average of the content of hydrogen measured in the inside is proper. The thickness D2 of the DLC layer 20 ranges from about 0.05 μm to about 0.55 μm and smoothly varies ranging from about 0.21 μm to about 0.32 μm in this embodiment, the thickness D2 varies between the minimum and maximum values, in a width of 0.11 μm. This variation in thickness is caused by variation in the condition for forming the layer in each portion of the bowed fishing lure base material 12. Both the aforementioned thicknesses D2 and D1 are actually measured for which a cut surface was obtained by using an electron microscope.

Figure 2:
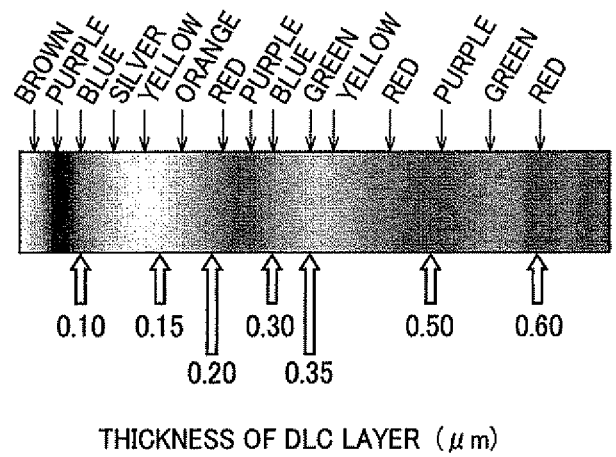
FIG. 2 shows the relationship between the color tone and the thickness of the DLC layer.

Such a DLC-coated fishing lure 10 presents an appearance of an interference color by forming the DLC layer 20. The DLC-coated fishing lure 10 in this embodiment presents an interference color in an enhanced yellow tone as a whole due to gold color TiN forming the intermediate layer 18. FIG. 2 shows the relationship between the thickness D2 of the DLC layer 20 and the interference color. It serially varies to present colors of brown, purple, blue, silver, yellow, orange, red, purple, blue, green, yellow, red, purple and so on, with thickening of the thickness D2. The DLC-coated fishing lure 10 in this embodiment having the thickness D2 ranging from about 0.21 μm to about 0.32 μm, serially varies to present the interference color including red, purple and blue through intermediate colors of such as purplish red and bluish purple.

Thus, the DLC-coated fishing lure 10 in this embodiment is preferably used for a fishing lure because it includes the DLC layer 20 having the thickness D2 ranging from about 0.05 μm to about 0.55 μm, and, then, it presents an appearance of the interference color such as a rainbow color and iridescence. Further, the DLC-coated fishing lure 10 is superior in durability due to its resistance to flaking and wearing because the DLC layer 20 is superior in hardness and abrasion resistance and in adhesion because of being formed on the fishing lure base material 12 through the intermediate layer 18 of TiN.

The fishing lure base material 12 in this embodiment is serially variable in color tone in accordance with variation in an incident angle of light, that is, a viewing angle because a surface of the fishing lure base material 12 has a smoothly bowed shape. In addition the fishing lure base material 12 in this embodiment is serially variable in color tone in accordance with variation in the thickness by variation of a condition to form each portion of the bowed shape and provides a further excellent interference color because the thickness D2 smoothly varies within a width of about 0.05 μm or over (0.11 μm in this embodiment) even if the DLC layer 20 is formed without an intentional control for the thickness of the layer.

Since the intermediate layer 18 ranges from about 0.5 μm to about 3 μm in this embodiment, the DLC layer 20 is superior in adhesion properly and in durability. Even if the thickness D1 is over 3 μm, the adhesion property does not almost vary, and, accordingly, forming the DLC layer 20 having 3 μm or below in thickness causes a low cost in manufacturing with a predetermined sufficient adhesion property.

Since the DLC layer 20 includes about 10 atom % hydrogen by forming in an atmosphere including hydrogen, duration of superior luster and long duration of the excellent interference color are achieved.

Figure 3:
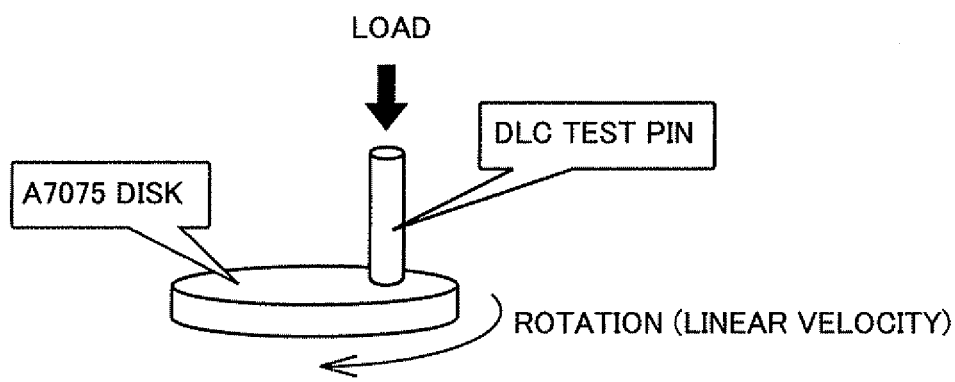
FIG. 3 illustrates a test for wearing resistance in a condition of the presence of the intermediate layer.
Figure 4A:
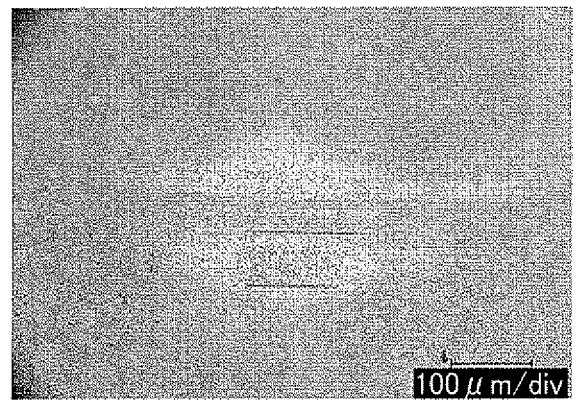
FIGS. 4A and 4B show worn traces on the curved surface in the top end portion of the test pin, worn in the test for wearing resistance in the conditions as shown in FIG. 3, using two kinds of test pins, one having the intermediate layer and the other having no intermediate layer.
Figure 4B:
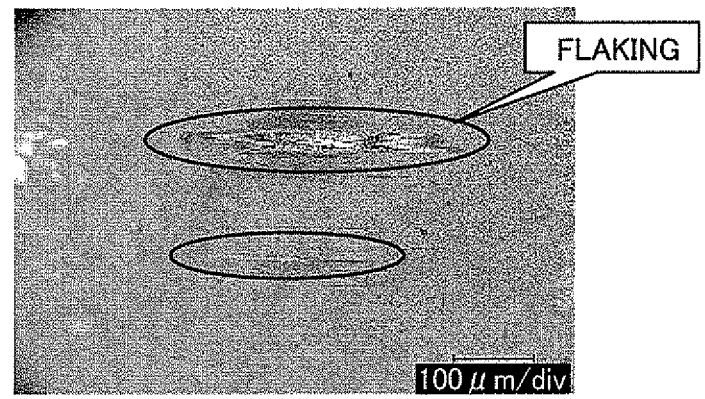

FIG. 3 explains a test for wearing resistance in a condition of the presence of the intermediate layer 18. FIGS. 4A and 4B show the results of the test in FIG. 3. The test for wearing resistance was performed in the following conditions using two kinds of test pins, one having the intermediate layer 18 and the other having no intermediate layer 18. The test pin has a cylindrical shape of 6 mm in diameter and 25 mm in height (length) and a curved surface of 5 R in its top end portion.

Conditions for Test
a) Material of pin: High speed steel powder
b) Counterpart (Disk): A7075 of aluminum alloy
    ("A7075" is a code for aluminum alloys of the Japanese Industrial Standards.)
c) Load: 5 N
d) Linear velocity: 100 mm/s
e) Duration: 900 seconds FIGS. 4A and 4B are prepared on the basis of photographs showing worn traces on the curved surface in the top end portion of the test pin. Large flakes are found on the surface of the comparative in which the DLC layer 20 was formed without the intermediate layer 18, and a slight worn trace is found but no flake is found on the surface of the present invention in which the intermediate layer 18 of TiN was formed. It is found that the presence of the intermediate layer 18 causes restraint of flakes and improvement in durability.

Above described in detail is the present invention with reference to the drawings. It is to be understood that the present invention may be embodied with other changes, improvements, and modifications that may occur to a person skilled in the art without departing from the scope and spirit of the invention defined in the appended claims.

What is claimed is:

1. A DLC-coated fishing lure comprising:
   a fishing lure base material made of metal and having a predetermined shape;
   an intermediate layer comprising at least one substance selected from:
      a first group of substances consisting of metals of the IIIb group, the IVa group, the Va group, and the VIa group of the periodic table of elements,
      a second group of substances consisting of carbides, nitrides, and carbon nitrides of the substances of the first group, and
      a third group of substances consisting of mutual solid solutions comprising at least one substance selected from the first group and the second group,
      the intermediate layer being formed on a surface of the fishing lure base material;
   a DLC layer having a thickness ranging from about 0.05 μm to about 0.55 μm and formed on the intermediate layer, wherein
      the DLC layer presents an appearance of an interference color, and
      the thickness of the DLC layer smoothly varies within a width of about 0.05 μm or over; and
   at least one through-hole in the fishing lure base material that accommodates a fishhook or a fishing line.

2. The fishing lure of claim 1, wherein the surface of the fishing lure base material has a smoothly bowed shape.

3. The fishing lure of claim 2, wherein a thickness of the intermediate layer ranges from about 0.5 μm to about 3 μm.

4. The fishing lure of claim 1, wherein a thickness of the intermediate layer ranges from about 0.5 μm to about 3 μm.

5. The fishing lure of claim 1, wherein the intermediate layer has a single-layer structure consisting of one kind of metal, and the DLC layer has a single-layer structure consisting of one kind of metal.

\* \* \* \* \*